(12) United States Patent
Connell, II et al.

(10) Patent No.: US 9,898,674 B2
(45) Date of Patent: Feb. 20, 2018

(54) SPOOF DETECTION FOR FACIAL RECOGNITION

(71) Applicant: International Business Machines Corporation, Armonk, NY (US)

(72) Inventors: Jonathan H. Connell, II, Cortlandt-Manor, NY (US); Nalini K. Ratha, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 110 days.

(21) Appl. No.: 14/965,604

(22) Filed: Dec. 10, 2015

(65) Prior Publication Data
US 2017/0169303 A1      Jun. 15, 2017

(51) Int. Cl.
*G06K 9/00*    (2006.01)
*G06K 9/46*    (2006.01)

(52) U.S. Cl.
CPC ..... *G06K 9/00899* (2013.01); *G06K 9/00228* (2013.01); *G06K 9/00248* (2013.01);
(Continued)

(58) Field of Classification Search
CPC . G06T 2207/30201; G06T 17/00; G06T 7/73; G06T 7/75; G06T 7/149; G06T 2219/2004; G06T 2219/2016; G06T 2219/2021; G06T 13/20; G06T 15/00; G06K 9/00281; G06K 9/00228; G06K 9/00214; G06K 9/00335; G06K 9/00302; H04N 5/23296
See application file for complete search history.

(56) References Cited

U.S. PATENT DOCUMENTS 5,581,276 A * 12/1996 Cipolla ................. G06F 3/017
                                                           345/156
6,580,810 B1    6/2003 Yang et al.
(Continued)

OTHER PUBLICATIONS

Kim et al.; "Face Liveness Detection Using Defocus", Department of Electrical and Electronic Engineering, Yonsei University, Seoul, South Korea, Sensors 15.1, ISSN 1424-8220, Jan. 2015, pp. 1537-1563.
(Continued)

*Primary Examiner* — Eueng-Nan Yeh
(74) *Attorney, Agent, or Firm* — Cahn & Samuels, LLP

(57) ABSTRACT

An embodiment of the invention provides a method of analyzing an image of a user to determine whether the image is authentic, where a first image of a user's face is received with a camera. Four or more two-dimensional feature points can be located that do not lie on the same two-dimensional plane. Additional images of the user's face can be received; and, the at least four two-dimensional feature points can be located on each additional image with the image processor. The image processor can identify displacements between the two-dimensional feature points on the additional image and the two-dimensional feature points on the first image for each additional image. A processor can determine whether the displacements conform to a three-dimensional surface model. The processor can determine whether to authenticate the user based on the determination of whether the displacements conform to the three-dimensional surface model.

20 Claims, 10 Drawing Sheets

(52) U.S. Cl.
CPC ..... *G06K 9/00268* (2013.01); *G06K 9/00281* (2013.01); *G06K 9/00288* (2013.01); *G06K 9/00302* (2013.01); *G06K 9/00335* (2013.01); *G06K 9/468* (2013.01)

(56) References Cited

U.S. PATENT DOCUMENTS

| | | | |
|---|---|---|---|
| 7,027,618 B2 | 1/2006 | Trajkovic et al. | |
| 7,809,166 B2 | 10/2010 | Funayama et al. | |
| 7,873,190 B2 | 1/2011 | Yuasa et al. | |
| 7,936,902 B2 * | 5/2011 | Kinoshita | G06K 9/00281 348/169 |
| 8,401,253 B2 | 3/2013 | Yamada et al. | |
| 8,737,697 B2 | 5/2014 | Morishita | |
| 8,860,795 B2 | 10/2014 | Suzuki | |
| 9,082,235 B2 | 7/2015 | Lau et al. | |
| 2005/0063582 A1 * | 3/2005 | Park | G06T 17/10 382/154 |
| 2007/0253604 A1 | 11/2007 | Inoue et al. | |
| 2009/0060290 A1 * | 3/2009 | Sabe | G06K 9/00248 382/118 |
| 2012/0306874 A1 | 12/2012 | Nguyen et al. | |
| 2014/0133743 A1 | 5/2014 | Cheon et al. | |
| 2015/0169945 A1 | 6/2015 | Connell et al. | |

OTHER PUBLICATIONS

Wen et al.; "Face Spoofing Detection With Image Distortion Analysis", IEEE Transactions on Information Forensics and Security, vol. 10, No. 4, Apr. 2015, pp. 746-761.

Erdogmus et al.; "Spoofing in 2D Face Recognition With 3D Masks and Anti-Spoofing With Kinect", Biometrics: Theory, Applications and Systems (BTAS), 2013 IEEE Sixth International Conference on Biometrics Compendium, Sep. 29-Oct. 2, 2013, pp. 1-6.

"Affine transformation", [retrieved on Nov. 16, 2015]. Retrieved from the Internet <URL: https://en.wikipedia.org/wiki/Affine_transformation>.

* cited by examiner

SPOOF DETECTION FOR FACIAL RECOGNITION

BACKGROUND

The present invention relates to systems, methods, and computer program products for spoof detection for facial recognition. A facial recognition system is a computer application for automatically identifying or verifying a person from a digital image or a video frame from a video source. One of the ways to do this is by comparing selected facial features from the image and a facial database. Such systems are typically used in security systems.

SUMMARY OF THE INVENTION

An embodiment of the invention provides a method of analyzing an image of a user to determine whether the image is authentic, where a first image of a user's face is received with a camera. Four or more two-dimensional feature points can be located with an image processing device connected to the camera, where the two-dimensional feature points do not lie on the same two-dimensional plane. One or more additional images of the user's face can be received with the camera; and, the at least four two-dimensional feature points can be located on each additional image with the image processor. The image processor can identify displacements between the two-dimensional feature points on the additional image and the two-dimensional feature points on the first image for each additional image. A processor connected to the image processing device can determine whether the displacements conform to a three-dimensional surface model. The processor can determine whether to authenticate the user based on the determination of whether the displacements conform to the three-dimensional surface model.

BRIEF DESCRIPTION OF THE SEVERAL VIEWS OF THE DRAWINGS

The present invention is described with reference to the accompanying drawings. In the drawings, like reference numbers indicate identical or functionally similar elements.

DETAILED DESCRIPTION

Figure 1:
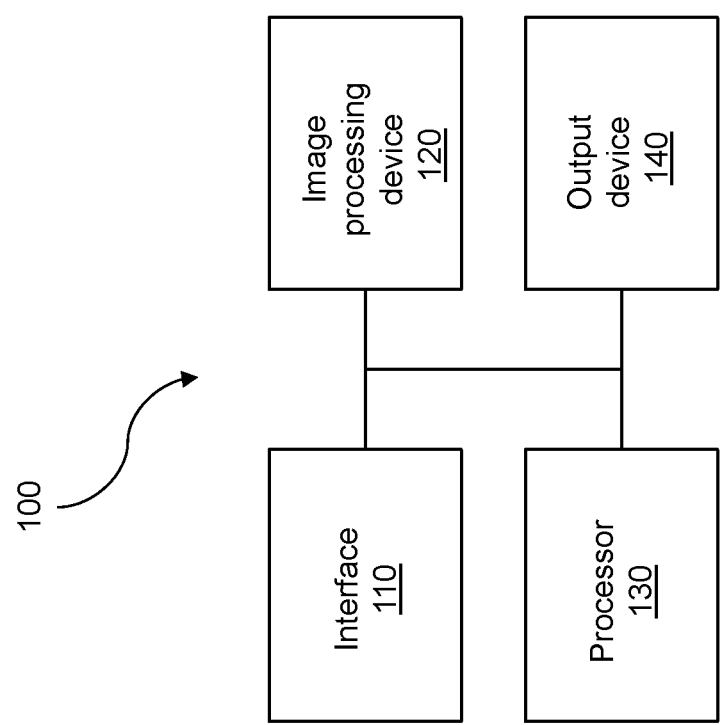
FIG. 1 is a diagram illustrating a hardware system for determining the liveness of the face of a user according to an embodiment of the invention.

Exemplary, non-limiting, embodiments of the present invention are discussed in detail below. While specific configurations are discussed to provide a clear understanding, it should be understood that the disclosed configurations are provided for illustration purposes only. A person of ordinary skill in the art will recognize that other configurations may be used without departing from the spirit and scope of the invention.

At least one embodiment of the invention provides a system that detects if a presented face in a facial recognition authentication system is a three-dimensional structure based on multiple selected images from the input video. When the user moves his head, the image of three-dimensional points such as the tip of his nose can shift in relation to other points on his face. From two or more sets of corresponding points, the parallax problem can be solved and the full three-dimensional structure of the point sets can be recovered. Since motion by the user is requested, the system can also challenge the user with particular face-based movements (e.g., look left, look right, etc.). The system can then evaluate whether the feature points are planar (a spoof) and whether the directional challenges and the user's responses (head motions) are correct. The number of moves can be increased for an arbitrary level of security.

In at least one embodiment, the full three-dimensional structure of the facial point sets is not determined, rather a check for co-planarity is performed. In the first image, five points can be selected: the outer two eye corners, the two mouth corners, and the tip of the nose. The user then moves his head and the same five points can be found in the new image. Leaving out the nose for now, the paired eye and mouth points can be used to form a homography between the two images.

The homography can allow the system to remap the remaining point from the second image to the first image. In at least one embodiment, if all five points are truly on a two-dimensional plane (e.g., the surface of a phone screen), then the remapped nose will fall very close to the nose originally marked in the image. In at least one embodiment, for a real three-dimensional face, the remapped position of the nose will shift (either up, down, left, right, etc.) relative to the original, which also offers an indication of the direction the head was turned.

A method for verifying the structure and liveness of a face can acquire a first image of a user's face and locate a set of four or more two-dimensional feature points, where the set of points are known not to lie on the same two-dimensional plane. A request can be made to the user to reorient his or her head in two or more particular directions. A sequence of images of the user's face can be acquired, one after each directional request; and the same set of four or more points can be located in each image. The system determines whether the head was reoriented in the requested direction in each image and whether the displacement of the points between two or more images in the sequence is consistent with a three-dimensional co-planar interpretation. The face can be accepted if all determined reorientations match the requested directions and the point co-planarity test fails.

Figure 2:
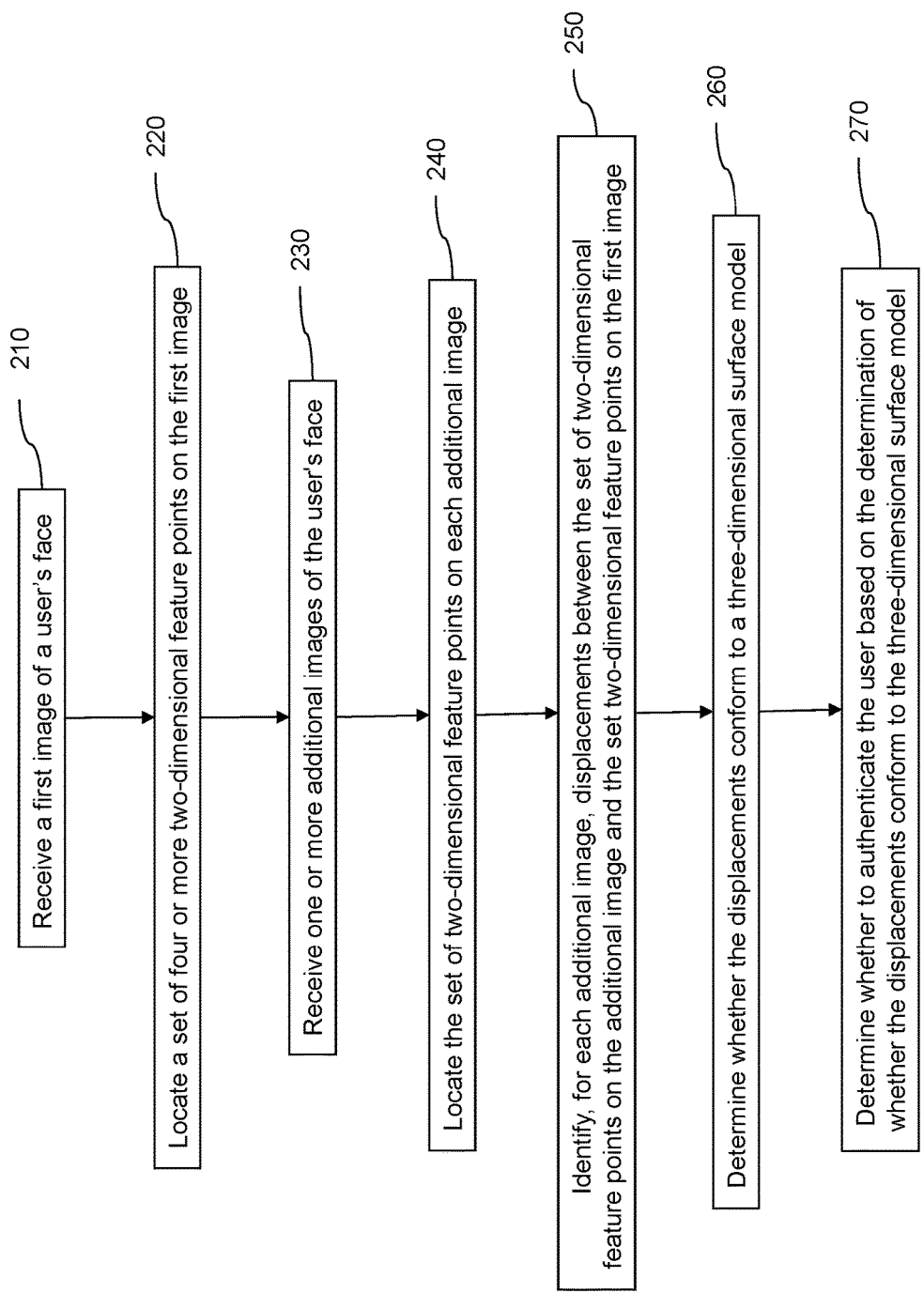
FIG. 2 is a flow diagram illustrating a method for determining the liveness of the face of a user according to an embodiment of the invention.

FIG. 1 is a diagram illustrating a hardware system 100 for determining the liveness of the face of a user according to an embodiment of the invention. FIG. 2 is a flow diagram illustrating a method for analyzing an image of a user to determine whether the image is authentic (e.g., using the system 100) according to an embodiment of the invention. As used herein, the term "authentic" includes an image of an actual three-dimensional face, as opposed to an image of a two-dimensional image (e.g., photograph on a smartphone) of a face.

In at least one embodiment of the invention, an interface 110 receives a first image of a user's face (210); and, an image processing device 120 locates a set of four or more two-dimensional feature points, wherein the set of two-dimensional feature points do not lie on the same two-dimensional plane (220). For example, the first image is processed to detect landmarks such as the user's outer eye corners, lip corners, middle of the lips, nose tip, middle of the nose bridge, and middles of the eye brows. In this example, the nose tip feature point is not be on the same two-dimensional plane as the eye corners and middle of the lips feature points. As used herein, the term "interface" includes a computer hardware device such as a camera or an input port; and the term "image processing device" includes a computer hardware device such as a microprocessor, CPU, etc. As used herein, the term "connected" includes operationally connected, logically connected, in communication with, physically or wirelessly connected, engaged, coupled, contacts, linked, affixed, and attached.

The interface 110 can receive one or more additional images of the user's face (230); and, the image processing device 120 can locate the set of two-dimensional feature points on each additional image (240). The image processing device 120 can also identify, for each additional image, displacements between the set of at least four two-dimensional feature points on the additional image and the set of at least four two-dimensional feature points on the first image (250).

A processor 130 connected to the image processing device 120 can determine whether the displacements conform to a three-dimensional surface model (260). In at least one embodiment, the three-dimensional surface model is an affine transformation, which is a linear mapping method that preserves points, straight lines, and planes. Sets of parallel lines remain parallel after an affine transformation. An affine transformation does not necessarily preserve angles between lines or distances between points, though it does preserve ratios of distances between points lying on a straight line.

In at least one embodiment, the set of two-dimensional feature points includes the user's nose, and the processor 130 determines that the displacements conform to the three-dimensional surface model when the displacement of the user's nose feature point is below a threshold displacement (e.g., 2 mm). As described above, if the feature points are truly on a two-dimensional plane (e.g., the surface of a phone screen), then the remapped nose will fall very close to the nose originally marked in the image.

The processor 130 can determine whether to authenticate the user based on the determination of whether the displacements conform to the three-dimensional surface model (270). The determination of whether the displacements conform to the three-dimensional surface model can include authenticating the user when the displacements do not conform to the three-dimensional surface model or rejecting the user when the displacements conform to the three-dimensional surface model.

Although the present embodiment includes both a processor and an image processing device, it is recognized in other embodiments that the system could lack the image processing device, wherein the functions of the image processing device are performed by the processor. As used herein, the term "processor" includes a computer hardware device such as a microprocessor, CPU, etc.

In at least one embodiment of the invention, the processor 130 can send an instruction to the user via an output device 140 (e.g., monitor, display, and/or speaker), where the instruction instructing the user to reposition the user's head. The processor 130 can determine whether the user's head was repositioned in compliance with the instruction in each additional image. For example, the instruction instructs the user to reposition his head to the left and the processor 110 compares the feature points on the additional image to the feature points on the first image to determine whether the user repositioned his head to the left. More specifically, head movement can be computed based on the movement of the facial landmarks with respect to a neutral position at the beginning. For example, if the nose tip landmark moved to the right with respect to the initial frontal position, then the head has been moved to right. Similarly the system can compute if the head was moved to the left, up, or down based on the nose tip relative movement in two frames. Other landmarks and combination of landmarks can also be used to estimate the head rotation to the instructions provided.

Figure 3:
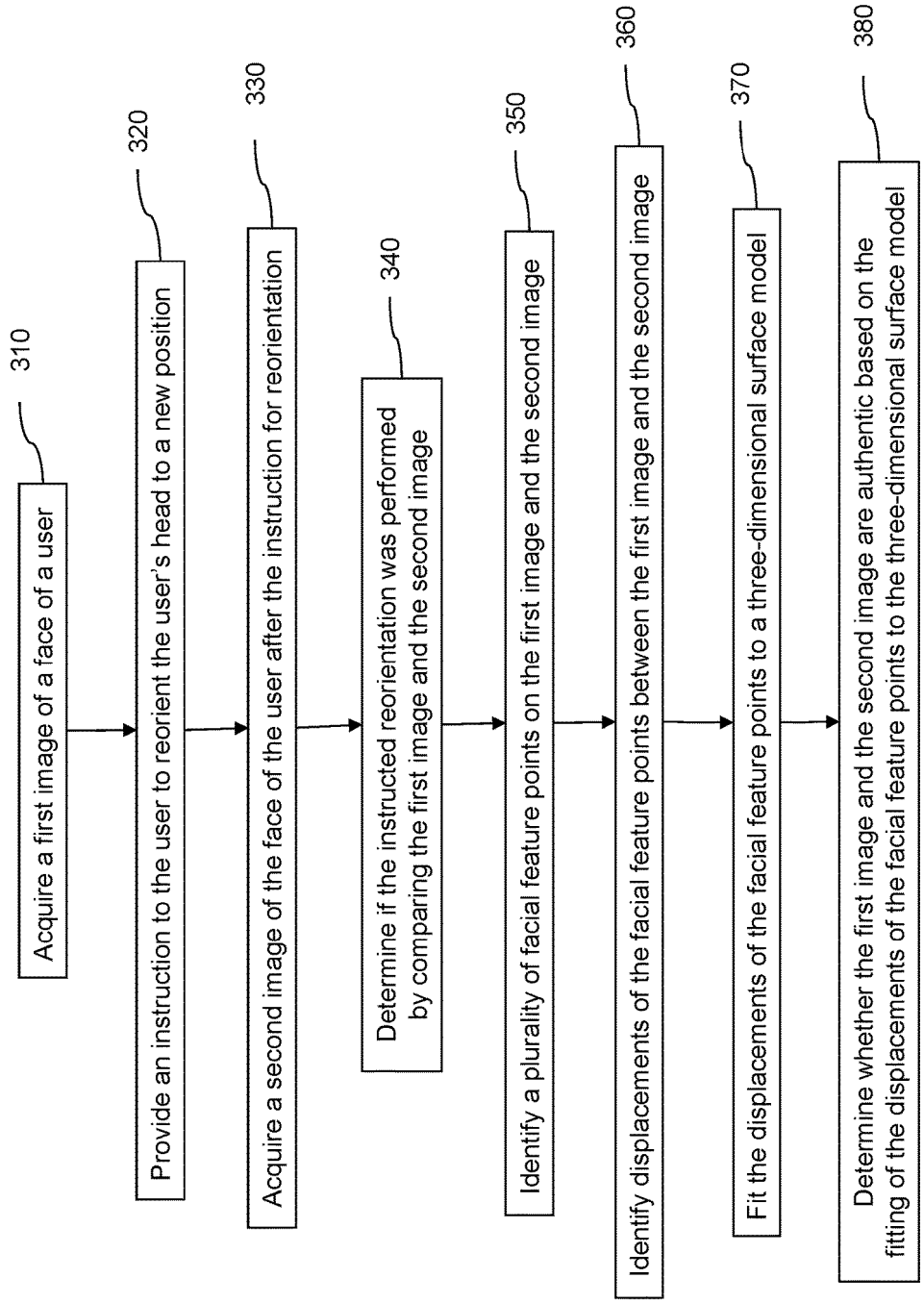
FIG. 3 is a flow diagram illustrating a method for analyzing an image of a user to determine whether the image is authentic according to an embodiment of the invention.

FIG. 3 is a flow diagram illustrating a method for determining the liveness of the face of a user (e.g., using the system 100) according to an embodiment of the invention. An interface 110 can acquire a first image of a face of a user (310); and, an output device 120 can provide an instruction to the user to reorient the user's head to a new position (320). The interface 110 can acquire a second image of the face of the user after the instruction for reorientation (330). A processor 130 connected to the interface 110 can determine if the instructed reorientation was performed by comparing the first image and the second image (340).

An image processing device 120 can identify a plurality of facial feature points on the first image and the second image (350). The image processing device 120 can also identify displacements of the facial feature points between the first image and the second image (360).

Figure 4B:
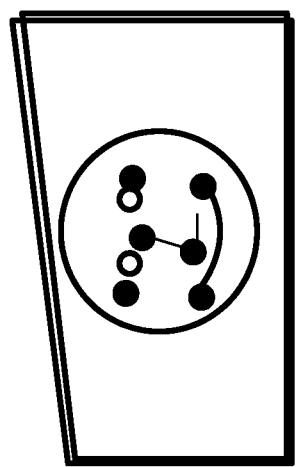
FIG. 4B is a diagram illustrating a two dimensional face image with six features according to an embodiment of the invention.
Figure 4A:
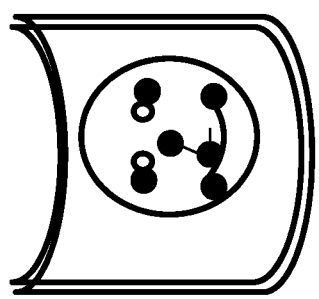
FIG. 4A is a diagram illustrating a singly curved surface with six features according to an embodiment of the invention.

The processor 130 can fit the displacements of the facial feature points to a three-dimensional surface model (370). The facial feature points can include a set of five or more points on the face that do not lie on a singly curved three-dimensional surface; and, the three-dimensional surface model can includes a singly curved three-dimensional surface. FIG. 4A is a diagram illustrating a singly curved surface with six features according to an embodiment of the invention. FIG. 4B is a diagram illustrating a two-dimensional face image with six features according to an embodiment of the invention. In FIGS. 4A and 4B, the features are illustrated with dark circles and the eyes of the face are illustrated with white circles.

Figure 5A:
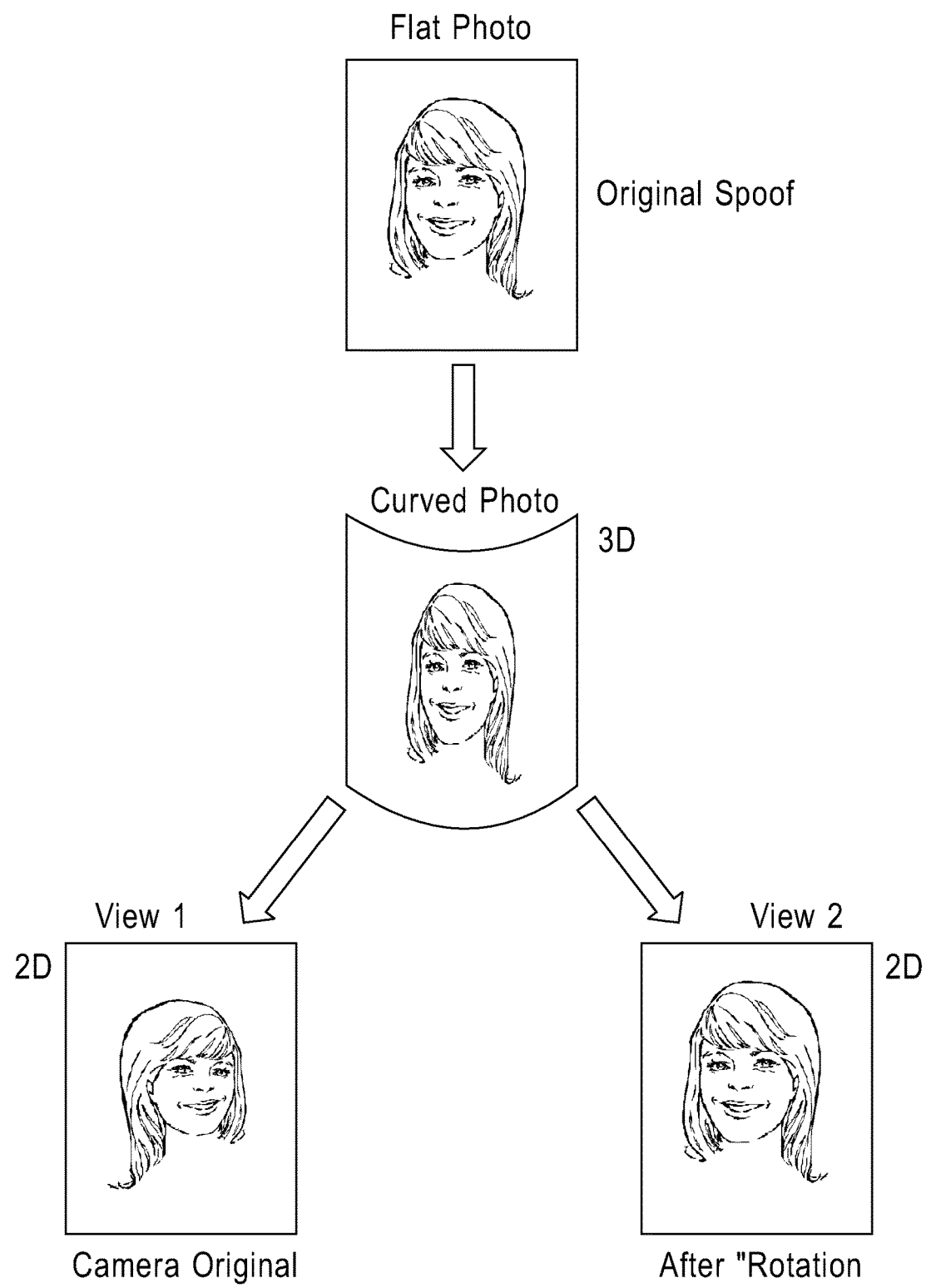
FIG. 5A is a diagram illustrating multiple views of a spoof photograph according to an embodiment of the invention.
Figure 5B:
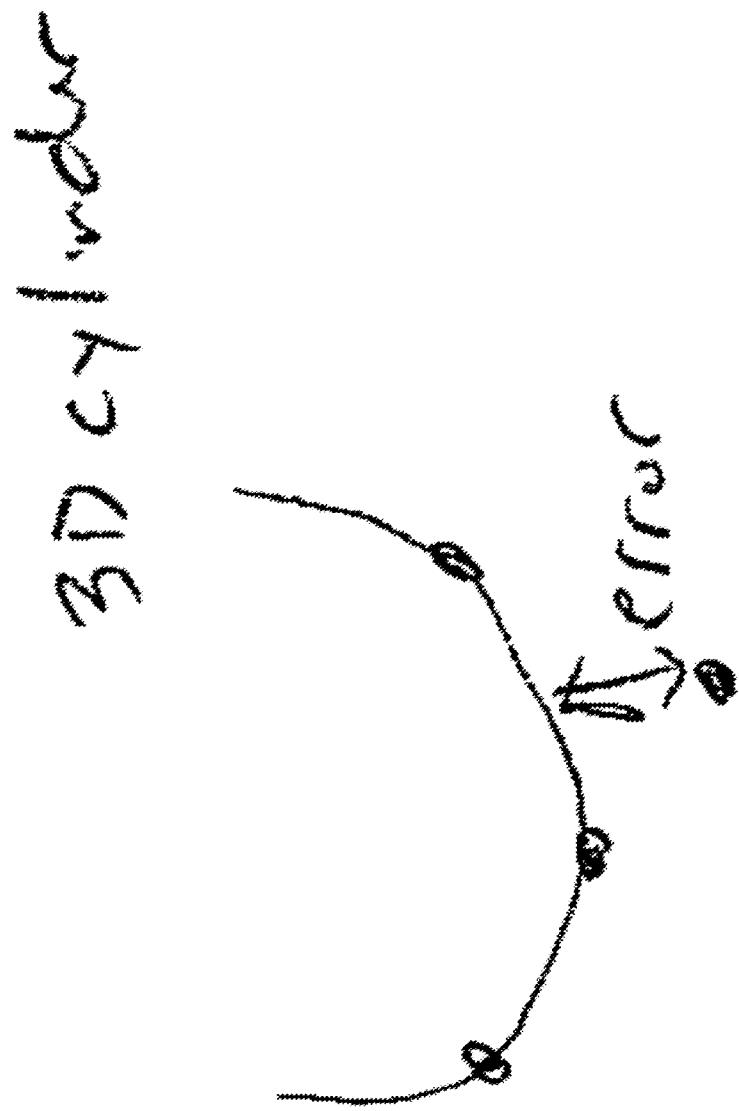
FIG. 5B is a diagram illustrating a top view of the curved photograph illustrated in FIG. 5A according to an embodiment of the invention.

FIG. 5A is a diagram illustrating multiple views of a spoof photograph according to an embodiment of the invention. Item 510 is a flat photograph of a face and item 520 is the same photograph that has been curved to mimic a three-dimensional face (also referred to herein as a "cylinder"). Item 530 (view 1) is an original photograph of the face from a different camera angle and item 540 (view 2) is a photograph of the face after rotation of the head. From view 1 and 2, the three-dimensional coordinates of points can be found and fit tested to one of six possible cylinders through five base points. FIG. 5B is a diagram illustrating a top view of the curved photograph illustrated in FIG. 5A (i.e., item 520). An error seen on the three-dimensional points along the cylindrical axis indicates that the input is a live face.

The processor 130 can determine whether the first image and the second image are authentic based on the fitting of the displacements of the facial feature points to the three-dimensional surface model (380). The processor 130 can identify the first image and the second image to be authentic when the instructed head reorientation was performed and the facial feature points fail to conform to the three-dimensional surface model. The processor 130 can identify the first image and the second image to be not authentic when the instructed head reorientation was not performed and/or the facial feature points conforms to the three-dimensional surface model.

In at least one embodiment, the sending of the instruction, the acquiring of the second image, and the determination of whether the instructed reorientation was performed are repeated, and the face is declared live only if all of the reorientations were determined to have been performed. As used herein, the term "live" includes a human being having flesh and blood, as opposed to a lifeless or nonliving object, such as a photograph or computer screen. Furthermore, the identification of the plurality of facial feature points, the identification of the displacements of the facial feature points, and the fitting of the displacements of the facial feature points to the three-dimensional surface model are repeated using the plurality of second images acquired, and the face is declared to be of a present person only if the sets of displacements fail to conform to the three-dimensional model.

In at least one embodiment, the fitting of the displacements of the facial feature points to the three-dimensional surface model produces an average residual error for the facial feature points, and the determination of whether the first image and the second image are authentic include identifying the first image and the second image to be not authentic when the average residual error for the facial feature points is above a threshold.

In at least one embodiment, the set of facial landmarks shown in FIGS. 4A and 4B are located, where all of these points represent planar points for a fake image (i.e., a two-dimensional image on paper or a computer screen). Hence, when the homography transform is computed and applied on one set from an image, the error difference between the location of the points in the second image and the transformation computed points will be small. When a real three-dimensional human face is presented, the three-dimensional structure of the face will not lend itself to a good homography. Thus, the projected points using the homography and the real location of the points can have a significant error residual. A threshold can be applied on the normalized error between the projected points and the new points computed on the new frame averaged over multiple frames can determine the final outcome.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 6:
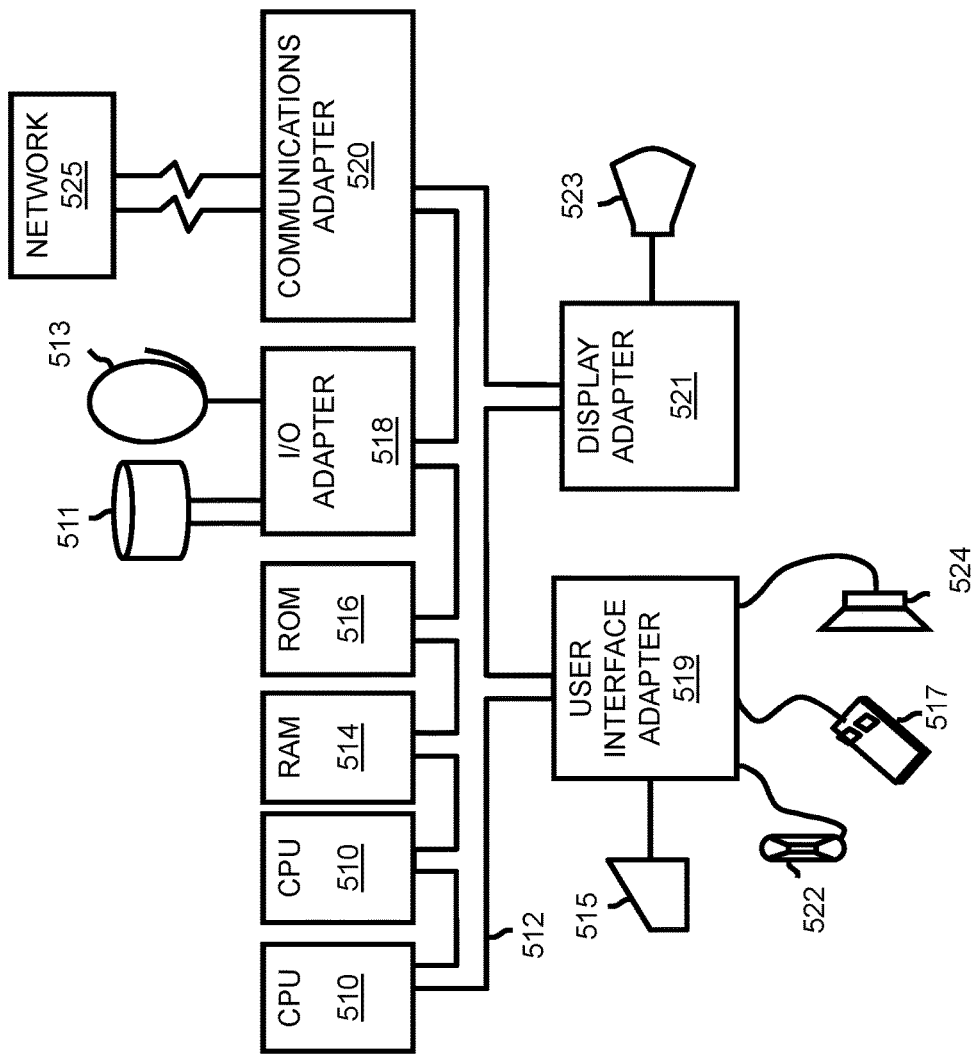
FIG. 6 is a diagram illustrating a computer program product for analyzing an image of a user to determine whether the image is authentic according to an embodiment of the present invention.

Referring now to FIG. 6, a representative hardware environment for practicing at least one embodiment of the invention is depicted. This schematic drawing illustrates a hardware configuration of an information handling/computer system in accordance with at least one embodiment of the invention. The system comprises at least one processor or central processing unit (CPU) 510. The CPUs 510 are interconnected with system bus 512 to various devices such as a random access memory (RAM) 514, read-only memory (ROM) 516, and an input/output (I/O) adapter 518. The I/O adapter 518 can connect to peripheral devices, such as disk units 511 and tape drives 513, or other program storage devices that are readable by the system. The system can read the inventive instructions on the program storage devices and follow these instructions to execute the methodology of at least one embodiment of the invention. The system further includes a user interface adapter 519 that connects a keyboard 515, mouse 517, speaker 524, microphone 522, and/or other user interface devices such as a touch screen device (not shown) to the bus 512 to gather user input. Additionally, a communication adapter 520 connects the bus 512 to a data processing network 525, and a display adapter 521 connects the bus 512 to a display device 523 which may be embodied as an output device such as a monitor, printer, or transmitter, for example.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.'

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 7:
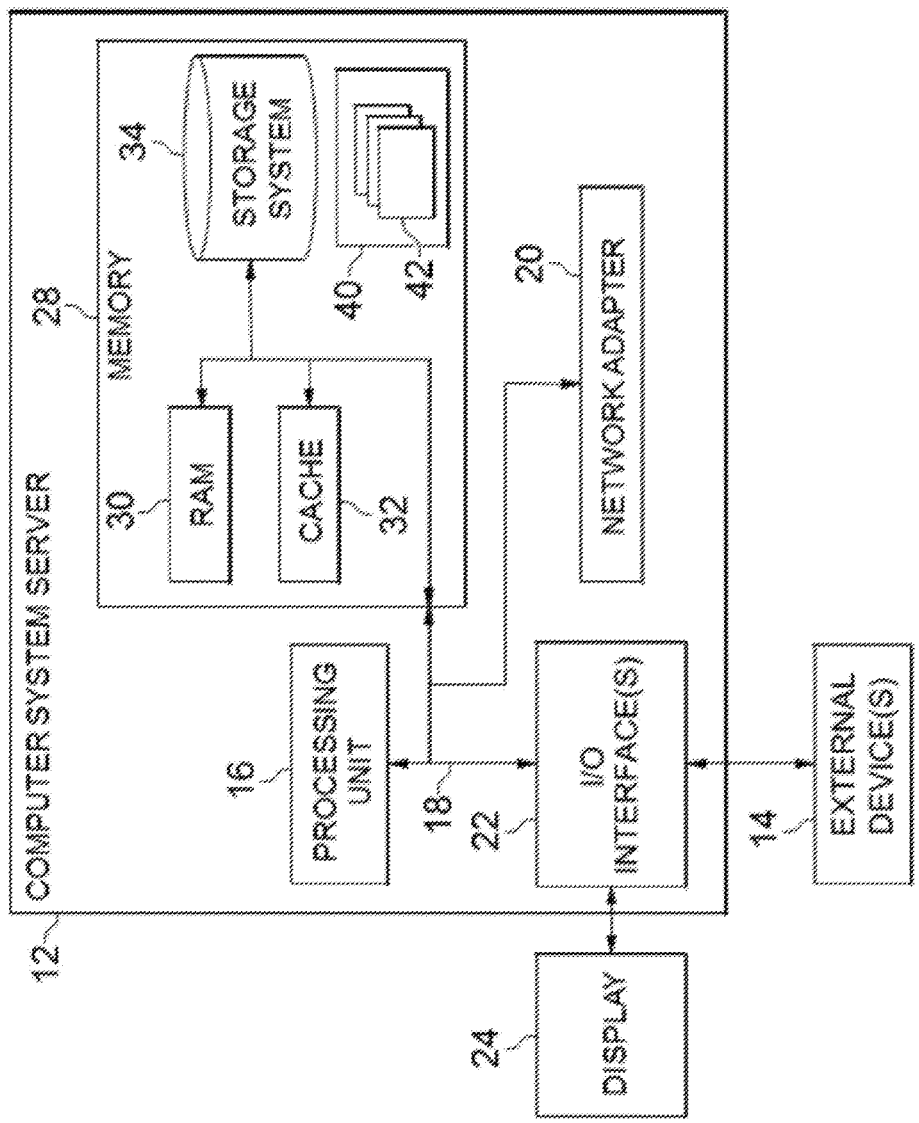
FIG. 7 depicts a cloud computing node according to an embodiment of the present invention.

Referring now to FIG. 7, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 8:
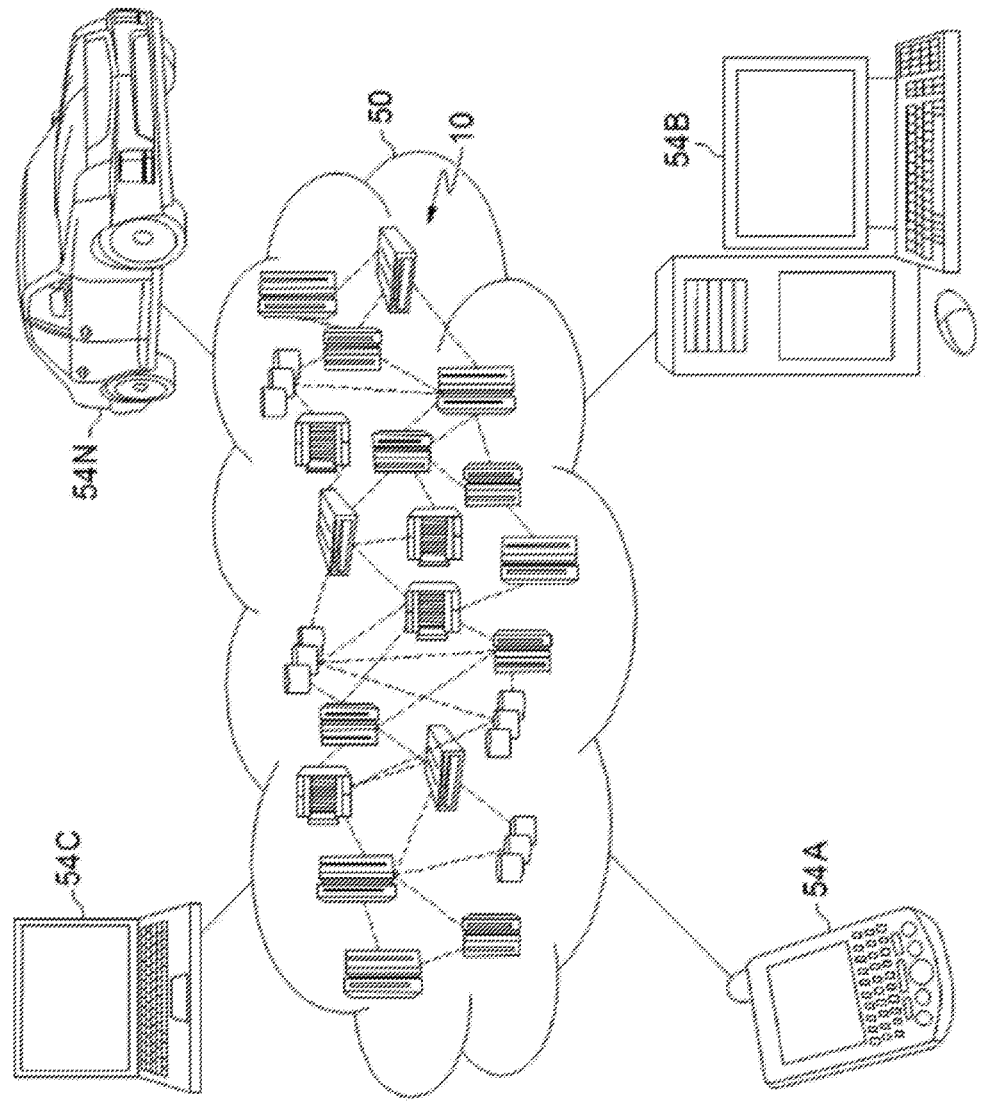
FIG. 8 depicts a cloud computing environment according to an embodiment of the present invention.

Referring now to FIG. 8, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
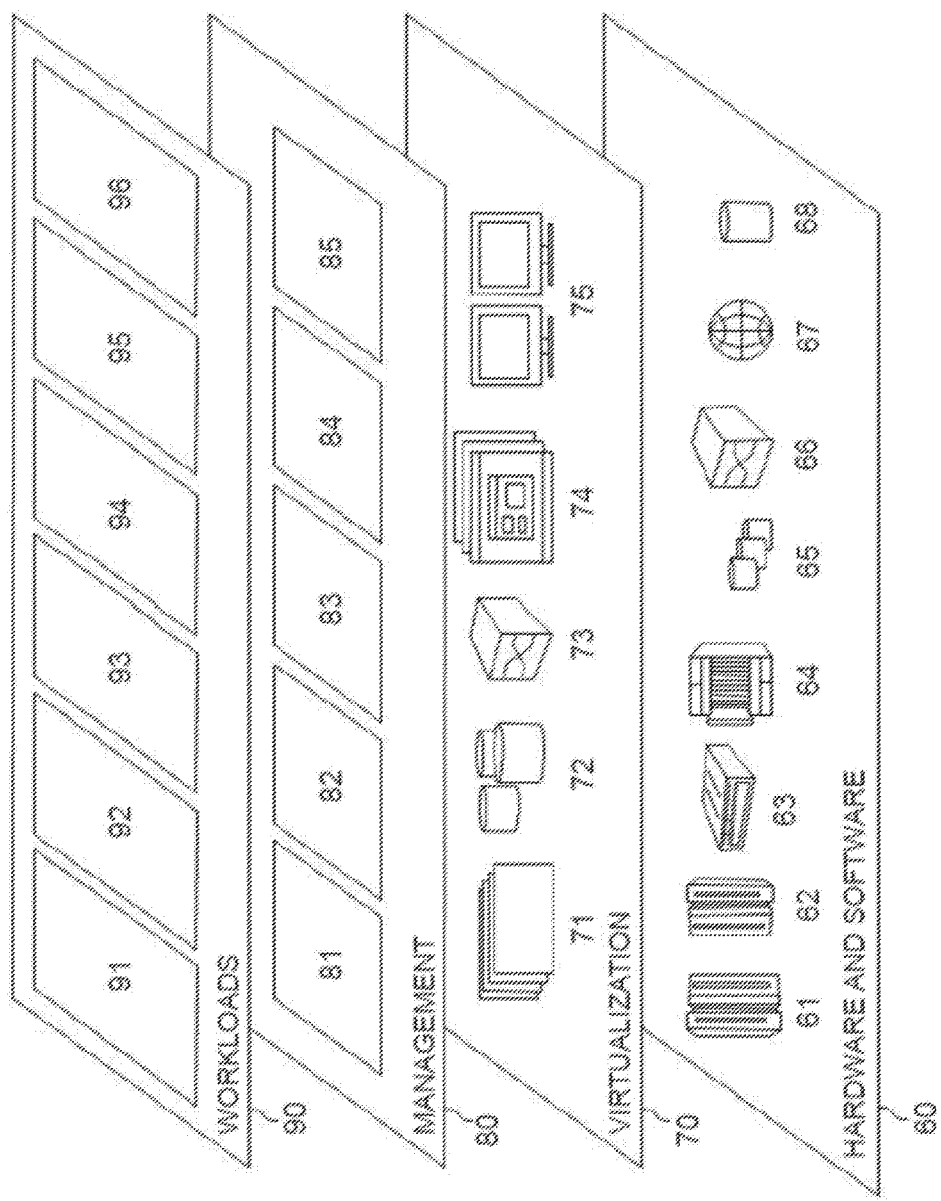
FIG. 9 depicts abstraction model layers according to an embodiment of the present invention.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and secure biometrics matching 96.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the root terms "include" and/or "have", when used in this specification, specify the presence of stated features, integers, steps, operations, elements, and/or components, but do not preclude the presence or addition of at least one other feature, integer, step, operation, element, component, and/or groups thereof.

The corresponding structures, materials, acts, and equivalents of all means plus function elements in the claims below are intended to include any structure, or material, for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for determining the liveness of the face of a user, said method comprising:
    acquiring a first image of a face of a user with an interface;
    providing an instruction to the user to reorient the user's head to a new position with an output device;
    acquiring a second image of the face of the user with the interface;
    determining if the instructed reorientation was performed with a processor connected to the interface by comparing the first image and the second image;
    identifying a plurality of facial feature points on the first image and the second image;
    identifying displacements of the facial feature points between the first image and the second image;
    fitting the displacements of the facial feature points to a three-dimensional surface model; and
    determining whether the first image and the second image are authentic with the processor based on said fitting of the displacements of the facial feature points to the three-dimensional surface model.

2. The method according to claim 1, wherein said determining of whether the first image and the second image are authentic includes identifying the first image and the second image to be authentic when the instructed head reorientation was performed and the displacements of the facial feature points fail to conform to the three-dimensional surface model.

3. The method according to claim 1, wherein said determining of whether the first image and the second image are authentic includes identifying the first image and the second image to be not authentic when at least one of the instructed head reorientation was not performed and the displacements of the facial feature points conforms to the three-dimensional surface model.

4. The method according to claim 1, wherein said determining of whether the first image and the second image are authentic includes identifying the first image and the second image to be not authentic when the instructed head reorientation was not performed and the displacements of the facial feature points conforms to the three-dimensional surface model.

5. The method according to claim 1 wherein said providing of the instruction, said acquiring of the second image, and said determining if the instructed reorientation was performed are repeated, and wherein the face is declared live only if all the reorientations were determined to have been performed.

6. The method according to claim 5, wherein said identifying of the plurality of facial feature points, said identifying of the displacements of the facial feature points, and said fitting of the displacements of the facial feature points to a three-dimensional surface model are repeated using the plurality of second images acquired, and wherein the face is declared live only if a plurality of the sets of displacements fail to conform to the three-dimensional model.

7. The method according to claim 1, wherein the facial feature points include a set of at least six points on the face that do not lie on a singly curved three-dimensional surface, and wherein the three-dimensional surface model includes a singly curved three-dimensional surface.

8. The method according to claim 7, wherein said fitting of the displacements of the facial feature points to the three-dimensional surface model produces an average residual error for the facial feature points, and
wherein said determining of whether the first image and the second image are authentic includes identifying the first image and the second image to be not authentic when the average residual error for the facial feature points is above a threshold.

9. The method according to claim 7, wherein said fitting of the displacements of the facial feature points to the three-dimensional surface model produces a residual error for the facial feature points, and
wherein said determining of whether the first image and the second image are authentic includes identifying the first image and the second image to be not authentic when the residual error for the facial feature points is above a threshold.

10. A method of analyzing an image of a user to determine whether the image is authentic, said method comprising:
receiving a first image of a user's face with a camera;
locating at least four two-dimensional feature points with an image processing device connected to the camera, wherein the at least four two-dimensional feature points do not lie on the same two-dimensional plane;
receiving at least one additional image of the user's face with the camera;
locating the at least four two-dimensional feature points on each additional image with an image processor;
identifying for each additional image displacements between the at least four two-dimensional feature points on the additional image and the at least four two-dimensional feature points on the first image with the image processor;
determining whether each of the identified displacements conform to a three-dimensional surface model with a processor connected to the image processing device; and
determining whether to authenticate the user with the processor, said determining of whether to authenticate the user being based on said determination of whether each of the identified displacements conform to the three-dimensional surface model.

11. The method according to claim 10, wherein the three-dimensional surface model is an affine transformation.

12. The method according to claim 10, wherein said determining whether to authenticate the user includes authenticating the user when each of the identified displacements do not conform to the three-dimensional surface model.

13. The method according to claim 10, wherein said determining whether to authenticate the user includes rejecting the user when each of the identified displacements conform to the three-dimensional surface model.

14. The method according to claim 10, further comprising:
providing an instruction to the user to reposition the user's head; and
determining whether the user's head was repositioned in compliance with the instruction in each additional image.

15. The method according to claim 10, wherein the at least four two-dimensional feature points includes the user's nose, and
wherein said determining whether the displacements conform to the three-dimensional surface model includes determining that the displacements conform to the three-dimensional surface model when a displacement of the user's nose feature point is below a threshold displacement.

16. A computer program product comprising:
a computer readable storage medium having stored thereon:
first program instructions executable by a device to cause the device to receive a first image of a user's face;
second program instructions executable by the device to cause the device to locate at least four two-dimensional feature points, wherein the at least four two-dimensional feature points do not lie on the same two-dimensional plane;
third program instructions executable by the device to cause the device to receive at least one additional image of the user's face;
fourth program instructions executable by the device to cause the device to locate the at least four two-dimensional feature points on each additional image;
fifth program instructions executable by the device to cause the device to identify for each additional image displacements between the at least four two-dimensional feature points on the additional image and the at least four two-dimensional feature points on the first image;
sixth program instructions executable by the device to cause the device to determine whether the identified displacements conform to a three-dimensional surface model; and
seventh program instructions executable by the device to cause the device to determine whether to authenticate the user based on the determination of whether the identified displacements conform to the three-dimensional surface model.

17. The computer program product according to claim 16, wherein the three-dimensional surface model is an affine transformation.

18. The computer program product according to claim 16, wherein said seventh program instructions authenticates the user when the identified displacements do not conform to the three-dimensional surface model.

19. The computer program product according to claim 16, wherein said seventh program instructions rejects the user when the identified displacements conform to the three-dimensional surface model.

20. The computer program product according to claim 16, further comprising:
   eighth program instructions executable by the device to cause the device to provide an instruction to the user to reposition the user's head; and
   ninth program instructions executable by the device to cause the device to determine whether the user's head was repositioned in compliance with the instruction in each additional image.

* * * * *